US012811296B2

(12) United States Patent
Sayama et al.

(10) Patent No.: US 12,811,296 B2
(45) Date of Patent: Nov. 24, 2026

(54) ANTENNA AND ANTENNA APPARATUS FOR VEHICLE

(71) Applicant: AGC Inc., Tokyo (JP)

(72) Inventors: Toshiki Sayama, Tokyo (JP); Hideaki Shoji, Tokyo (JP); Yusuke Kato, Tokyo (JP); Shoichi Takeuchi, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 19/006,946

(22) Filed: Dec. 31, 2024

(65) Prior Publication Data

US 2025/0141103 A1 May 1, 2025

Related U.S. Application Data

(63) Continuation of application No. PCT/JP2023/024824, filed on Jul. 4, 2023.

(30) Foreign Application Priority Data

Jul. 6, 2022 (JP) ................................ 2022-109313

(51) Int. Cl.
*H01Q 5/385* (2015.01)
*H01Q 1/32* (2006.01)

(52) U.S. Cl.
CPC ............... *H01Q 5/385* (2015.01); *H01Q 1/32* (2013.01)

(58) Field of Classification Search
CPC ............... H01Q 1/3291; H01Q 1/1271; H01Q 1/37275; H01Q 1/32; H01Q 21/28
See application file for complete search history.

(56) References Cited

U.S. PATENT DOCUMENTS 11,569,578 B2 * 1/2023 Hasegawa ............ H01Q 9/0414
11,705,623 B2 * 7/2023 Sczesny ............... H01Q 1/1214 343/713

(Continued)

FOREIGN PATENT DOCUMENTS

JP 2002-158534 A 5/2002
JP 2011-087215 A 4/2011

(Continued)

OTHER PUBLICATIONS

International Searching Authority, "International Search Report," issued in connection with International Patent Application No. PCT/JP2023/024824, dated Sep. 19, 2023.

(Continued)

*Primary Examiner* — Wei (Victor) Y Chan
(74) *Attorney, Agent, or Firm* — Foley & Lardner LLP

(57) ABSTRACT

An antenna including: a radiating plate having a radiating surface; a ground plate disposed on the radiating plate with a dielectric interposed therebetween; and a parasitic element including: a first parasitic conductor disposed in a first direction with respect to a center of gravity of the radiating plate in a plan view of the radiating plate; a second parasitic conductor disposed in a second direction opposite to the first direction with respect to the center of gravity of the radiating plate in a plan view of the radiating plate; and a third parasitic conductor connecting the first parasitic conductor and the second parasitic conductor, in which the third parasitic conductor includes a portion that passes in a vicinity of the center of gravity of the radiating plate and extends in the first direction and the second direction in a plan view of the radiating plate.

20 Claims, 7 Drawing Sheets

(56) References Cited

U.S. PATENT DOCUMENTS

| | | | | |
|---|---|---|---|---|
| 11,848,480 | B2 * | 12/2023 | Chen | H01Q 1/2283 |
| 2019/0280386 | A1 * | 9/2019 | Kowaita | H01Q 1/3275 |
| 2020/0295444 | A1 | 9/2020 | Sampo | |
| 2021/0036412 | A1 * | 2/2021 | Kodama | H01Q 1/1271 |
| 2021/0091480 | A1 | 3/2021 | Sampo | |
| 2024/0047879 | A1 * | 2/2024 | Nozaki | H01Q 19/22 |

FOREIGN PATENT DOCUMENTS

| | | | |
|---|---|---|---|
| JP | 2012-070156 | A | 4/2012 |
| JP | 5592739 | B2 | 9/2014 |
| JP | 2016-171439 | A | 9/2016 |
| JP | 6391504 | B2 | 9/2018 |
| JP | 2019-075644 | A | 5/2019 |
| JP | 2019-161312 | A | 9/2019 |
| WO | WO-2005/015681 | A2 | 2/2005 |
| WO | WO-2019/163521 | A1 | 8/2019 |
| WO | WO-2019/208453 | A1 | 10/2019 |

OTHER PUBLICATIONS

International Searching Authority, "Written Opinion," issued in connection with International Patent Application No. PCT/JP2023/024824, dated Sep. 19, 2023.

* cited by examiner

ANTENNA AND ANTENNA APPARATUS FOR VEHICLE

INCORPORATION BY REFERENCE

This application is based upon and claims the benefit of priority from Japanese patent application No. 2022-109313 filed on Jul. 6, 2022, the disclosure of which is incorporated herein in its entirety by reference.

BACKGROUND

The present disclosure relates to an antenna and an antenna apparatus for vehicle.

In recent years, there has been a trend toward expanding services that use high-speed, large-capacity wireless communication systems using microwave and millimeter wave frequency bands, such as the transition from 4G LTE to 5G (sub-6). The bands used tend to expand from the 3 GHz band to the 5 to 6 GHz band. In particular, in the field of antennas for vehicle, as the automatic driving level rises, there is a tendency toward vehicles equipped with communication systems that realize V2X (Vehicle to Everything), such as vehicle-to-vehicle communication and road-to-vehicle communication. For example, vehicles are evolving so as to be able to acquire a variety of external information relevant to safety by using transmission and reception of narrow-band radio waves in the 5.9 GHz band. Such V2X communication systems require antennas (V2X antennas) that can transmit and receive vertically polarized radio waves with a desired gain in a frequency band (5.8 GHz band (Japan)/5.9 GHz band (Europe and the US)) that meets the V2X communication standards.

V2X antennas are required to have directivity that can ensure gain over a 180° ranging from the vehicle travel direction (forward or backward) to +90° to the left and right in the horizontal plane. As such V2X antennas, patch antennas are known that are each equipped with parasitic elements on opposite sides of the radiating element for increasing directivity not only in the normal direction of the patch surface of the radiating element but also in the left and right directions (vehicle width direction) of the patch surface (see, for example, Patent Literatures 1, 2 and 3).

Patent Literature 1: Japanese Unexamined Patent Application Publication No. 2019-075644

Patent Literature 2: International Patent Publication No. WO 2019/163521

Patent Literature 3: International Patent Publication No. WO 2019/208453

SUMMARY

However, the parasitic elements disposed on opposite sides of the radiating element are disposed apart from each other, and a misalignment may occur in their disposal positions. For example, even if one parasitic element is accurately disposed, the overall directivity level of the antenna may vary if the other parasitic element is displaced from its accurate disposal position.

The present disclosure provides an antenna that enhances a disposal accuracy of parasitic conductors disposed on opposite sides of a radiating plate, and an antenna apparatus for vehicle including the antenna.

In a first embodiment of the present disclosure, there is provided an antenna including:

a radiating plate having a radiating surface;

a ground plate disposed on the radiating plate with a dielectric interposed therebetween, the ground plate being disposed on an opposite side of the radiating surface of the radiating plate; and a parasitic element including: a first parasitic conductor disposed in a first direction with respect to a center of gravity of the radiating plate in a plan view of the radiating plate; a second parasitic conductor disposed in a second direction opposite to the first direction with respect to the center of gravity of the radiating plate in a plan view of the radiating plate; and a third parasitic conductor connecting the first parasitic conductor and the second parasitic conductor, in which the third parasitic conductor includes a portion that passes in a vicinity of the center of gravity of the radiating plate and extends in the first direction and the second direction in a plan view of the radiating plate.

A second embodiment may be the antenna according to the first embodiment, in which W/L satisfies $$W/L \leq 0.50,$$

where, in a plan view of the radiating plate, a direction orthogonal to the first direction is a third direction, a width of the third parasitic conductor in the third direction is W, and a length of the first parasitic conductor or the second parasitic conductor in the third direction is L.

A third embodiment may be the antenna according to the second embodiment, in which an end of the third parasitic conductor is connected to the first parasitic conductor or the second parasitic conductor at a position in a range of 30% or more and 70% or less when the length L is 100%.

A fourth embodiment may be the antenna according to any one of the first to third embodiments, in which, in a plan view of the radiating plate, a direction orthogonal to the first direction is defined as a third direction; a direction opposite to the third direction is defined as a fourth direction; the third direction with respect to a reference line is defined to be positive, the reference line passing through the center of gravity of the radiating plate, the reference line being parallel to the first direction; the fourth direction with respect to the reference line is defined to be negative; and a length of the radiating surface in the third direction is defined as D, and the third parasitic conductor overlaps with an area in a range of ±0.30×D from the reference line in a plan view of the radiating plate.

A fifth embodiment may be the antenna according to any one of the first to fourth embodiments, in which, in a plan view of the radiating plate, the second parasitic conductor has the same shape as the first parasitic conductor.

A sixth embodiment may be the antenna according to any one of the first to fifth embodiments, in which, in a plan view of the radiating plate, an outer edge of the radiating plate is of a substantially rectangular shape having a pair of sides parallel to the first direction and a pair of sides parallel to a direction orthogonal to the first direction, and a feeding line is disposed on a plane parallel to the radiating surface, the feeding line being an extension conductor connected to a feeding point of the radiating plate.

A seventh embodiment may be the antenna according to any one of the first to sixth embodiments, in which at least one of the first parasitic conductor and the second parasitic conductor does not overlap with the radiating plate in a plan view of the radiating plate.

An eighth embodiment may be the antenna according to any one of the first to seventh embodiments, in which at least one of the first parasitic conductor and the second parasitic conductor does not overlap with the ground plate in a plan view of the radiating plate.

A ninth embodiment may be the antenna according to any one of the first to eighth embodiments, in which the parasitic element has a point-symmetric shape.

A tenth embodiment may be an antenna according to the ninth embodiment, in which a center of gravity of the parasitic element overlaps with the center of gravity of the radiating plate in a plan view of the radiating plate.

An eleventh embodiment may be the antenna according to any one of the first to tenth embodiments in which the first parasitic conductor and the second parasitic conductor are disposed on an opposite side of the ground plate with respect to the radiating plate.

A twelfth embodiment may be the antenna according to any one of the first to eleventh embodiments, in which the first parasitic conductor and the second parasitic conductor are disposed on a plane different from the radiating surface.

A thirteenth embodiment may be an antenna according to any one of the first to twelfth embodiments, in which the third parasitic conductor has a bridge shape that extends in a direction different from a direction parallel to the radiating surface and that spans the radiating surface.

A fourteenth embodiment may be the antenna according to any one of the thirteenth embodiments, in which the first parasitic conductor and the second parasitic conductor do not overlap with the radiating plate in a plan view of the radiating plate and are disposed on the same plane as the radiating surface.

A fifteenth embodiment may be the antenna according to any one of the first to fourteenth embodiments, further including a connector, disposed on an opposite side of the radiating surface with respect to the ground plate, for connection to a coaxial cable.

A sixteenth embodiment may be the antenna according to any one of the first to fifteenth embodiments, in which the third parasitic conductor is fixed by a dielectric.

A seventeenth embodiment may be the antenna according to the sixteenth embodiment, in which the first parasitic conductor and the second parasitic conductor are each in contact with air except for a portion connected to the third parasitic conductor.

In an embodiment of the present disclosure, an antenna apparatus for vehicle is provided that includes the antenna.

An eighteenth embodiment is an antenna apparatus for vehicle, including:

a window glass for vehicle; and an antenna according to any one of the first to seventeenth embodiments, disposed so that the radiating surface faces the window glass, in which the radiating surface is inclined at an angle of +15° or less with respect to a vertical plane perpendicular to a horizontal plane.

A nineteenth embodiment may be the antenna apparatus for vehicle according to the eighteenth embodiment, in which, on the radiating surface, a straight line connecting the center of gravity of the radiating plate and a feeding point of the radiating plate is inclined at an angle of ±15° or less with respect to a vertical plane perpendicular to a horizontal plane, and a frequency band of radio waves received by the antenna includes a 5.8 GHz band or a 5.9 GHz band.

A twentieth embodiment may be the antenna apparatus for vehicle according to the eighteenth or nineteenth embodiment, in which the antenna is a V2X antenna.

According to an embodiment of the present disclosure, it is possible to provide an antenna that enhances a disposal accuracy of parasitic conductors disposed on opposite sides of a radiating plate, and an antenna apparatus for vehicle including the antenna.

DETAILED DESCRIPTION

Figure 1:
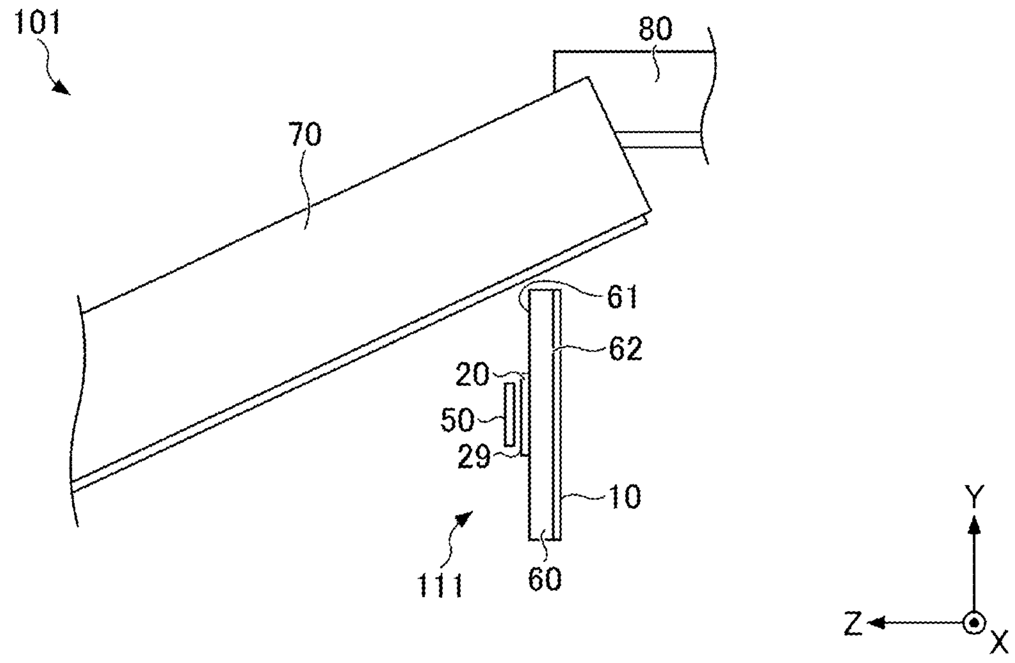
FIG. 1 is a partially enlarged side view illustrating an antenna apparatus for vehicle including an antenna of the present embodiment.

The present embodiment will be described below with reference to the drawings. For ease of understanding, the scale of each part in the drawings may differ from the actual scale. Directions such as parallel, right angle, orthogonal, horizontal, vertical, up and down, left and right, and terms such as same and equal are allowed to have misalignments or differences that do not impair the actions and effects of the embodiment. The shapes of the corners are not limited to right angles, and may be rounded in a bow shape. Overlapping may include the meaning of partially overlapping. An X-axis direction, a Y-axis direction, and a Z-axis direction respectively represent directions parallel to an X-axis, directions parallel to a Y-axis, and directions parallel to a Z-axis. The X-axis direction, the Y-axis direction, and the Z-axis direction are mutually orthogonal. An XY plane, a YZ plane, and a ZX plane respectively represent imaginary planes parallel to the X-axis direction and the Y-axis direction, imaginary planes parallel to the Y-axis direction and the Z-axis direction, and imaginary planes parallel to the Z-axis direction and the X-axis direction.

The antenna of the present embodiment is applicable to, for example, a V2X communication system, a fifth generation mobile communication system (so-called 5G), an in-vehicle radar system, and the like. However, the systems to which the antenna is applicable is not limited to these. An example of a V2X communication system is an ETC system. The antenna of each embodiment according to the present disclosure is suitable for use in a frequency band of 6 GHz or less (sub-6) among the frequency bands used in 5G. For example, the antenna is suitable for transmitting and receiving (one or both of transmitting and receiving) radio waves in the 5.8 GHz or 5.9 GHz band. However, the antenna of the present embodiment is not limited to the frequency bands used in 5G (3.3 GHz or more), and can also be used in 4G LTE, millimeter wave bands (30 GHz to 300 GHz), and microwaves.

Examples of window glass for vehicle to which the present embodiment is applied include a windshield attached to the front of a vehicle, a rear glass attached to the rear of a vehicle, and a side glass attached to the side of a vehicle.

FIG. 1 is a partially enlarged side view illustrating an antenna apparatus for vehicle including an antenna of the present embodiment. The antenna apparatus 101 shown in FIG. 1 is an example of antenna apparatus for vehicle, and includes a window glass 70 and an antenna 111.

The window glass 70 is a window glass for vehicle, for example, a windshield installed at the front side of a vehicle 80. The window glass 70 is attached to the front side window frame of the vehicle 80 at a predetermined installation angle θ with respect to the horizontal plane. In this example, the horizontal plane is parallel to the ZX plane.

The antenna 111 is attached to the vehicle interior side of the window glass 70 with a member such as a housing interposed therebetween, and is attached, for example, near the center of the upper side area of the window glass 70. The number of antennas 111 attached to the window glass 70 may be one or greater. The antenna 111 is used, for example, as a V2X antenna that transmits and receives radio waves including a 5.8 GHz band or a 5.9 GHz band. The antenna 111 includes a patch antenna configuration including a radiating plate 20 with a radiating surface 29 as a patch surface. In this example, the antenna 111 includes a ground plate 10, a radiating plate 20, a dielectric substrate 60, and a parasitic element 50. The ground plate 10, the radiating plate 20, the dielectric substrate 60, and the parasitic element 50 may be housed in a housing such as an outer case of the antenna 111, and are fixed, for example, inside the housing. The housing such as the outer case is a member whose main component is a dielectric material such as resin.

The ground plate 10 is typically a planar conductive layer whose surface is parallel to the XY plane, and functions as the ground of the antenna 111. The ground plate 10 is a plate-shaped or film-shaped conductor. Examples of conductor materials used for the ground plate 10 include silver and copper, but are not limited to these. The shape of the ground plate 10 is, for example, a square, but may be a polygon other than a square, or may be another shape such as a circle.

Note that the term "plate-shaped or film-shaped" is not limited to a two-dimensional shape, but may include a three-dimensional shape, such as a convex, concave, or wavy shape. This "plate-shaped or film-shaped" is not limited to the shape of the ground plate 10, but may also be applied to the shape of the radiating plate 20, the dielectric substrate 60, or the parasitic element 50.

The radiating plate 20 is a plate-shaped or film-shaped conductor disposed to face the ground plate 10 in the Z-axis direction, and its area in a plan view is typically designed to be smaller than that of the ground plate 10. The radiating plate 20 is a planar conductive layer whose surface is parallel to the XY plane, and functions as a radiating element of the antenna 111. Examples of conductor materials used for the radiating plate 20 include silver and copper, but the materials are not limited to these. The shape of the radiating plate 20 is, for example, a square, but it may be a polygon other than a rectangle or a square, or may be another shape such as a circle. The radiating plate 20 has a radiating surface 29 that faces the ground plate 10 in the normal direction of the ground plate 10 (in this example, the positive side in the Z-axis direction).

The radiating plate 20 is disposed away from the ground plate 10. The medium between the ground plate 10 and the radiating plate 20 includes at least one dielectric of space and a dielectric substrate. The antenna 111 shows a case in which the medium between the ground plate 10 and the radiating plate 20 consists only of the dielectric substrate 60. When the medium is space (air), the radiating plate 20, the ground plate 10, and the parasitic element 50 may be fixed by the housing (not shown) as necessary.

The dielectric substrate 60 is a plate-shaped or film-shaped dielectric layer whose main component is a dielectric. The dielectric substrate 60 has a first surface 61 and a second surface 62 opposite the first surface 61. The surfaces 61 and 62 are parallel to the XY plane. The radiating plate 20 is provided on the surface 61, which is one surface of the dielectric substrate 60, and the ground plate 10 is provided on the surface 62, which is the other surface of the dielectric substrate 60. The ground plate 10 is disposed on the side opposite the radiating surface 29 of the radiating plate 20 with the dielectric substrate 60 interposed therebetween.

The dielectric substrate 60 may be, for example, a dielectric substrate such as a glass epoxy substrate, or a dielectric sheet. The examples of dielectric material to be used for the dielectric substrate 60 include glass such as quartz glass, ceramics, fluorine-based resin such as polytetrafluoroethylene, liquid crystal polymer, cycloolefin polymer, but the material is not limited to these.

Figure 2:
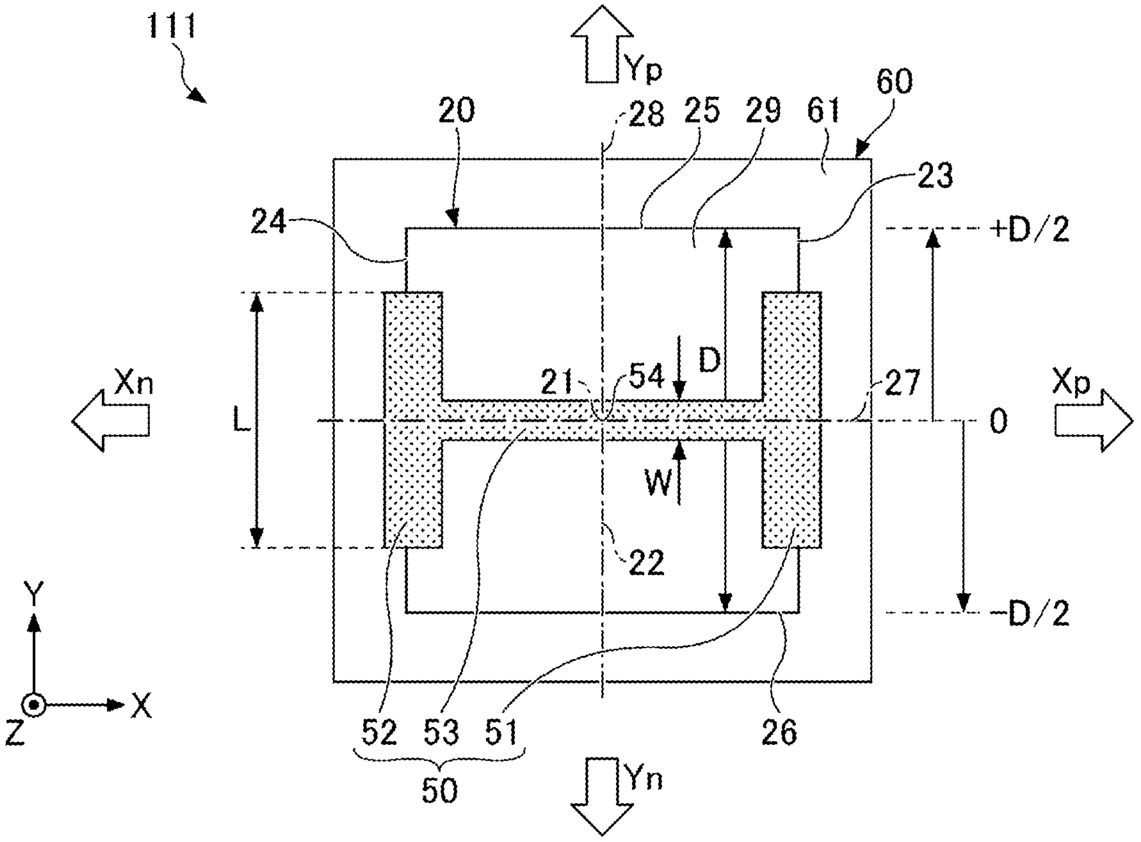
FIG. 2 is a plan view of the antenna of the present embodiment.
Figure 3:
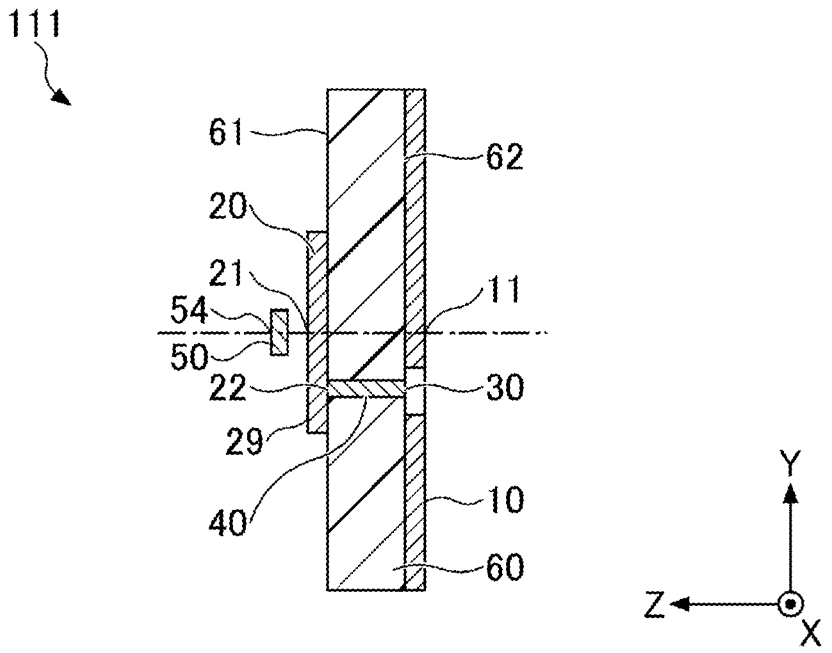
FIG. 3 is a vertical cross-sectional view of the antenna of the present embodiment.

FIG. 2 is a plan view of the antenna of the present embodiment. Plan view refers to a perspective from the positive side in the Z-axis direction. FIG. 2 shows a front view of the antenna 111 with the antenna 111 mounted on a vehicle. FIG. 3 is a vertical cross-sectional view of the antenna of the present embodiment. FIG. 3 is a cross-sectional view in the YZ plane passing through the center of gravity 21 of the radiating plate 20. The feeding portion 30 and the radiating plate 20 are connected by a connecting conductor 40 passing through the inside of the dielectric substrate 60 in the Z-axis direction.

The feeding portion 30 is a location where power is supplied with or without contact, and is a portion to which one end of a feeding line (not shown) is connected or adjacent. Specific examples of the feeding line include transmission lines such as coaxial cables, microstrip lines, strip lines, coplanar lines, and slot lines. The other end of the feeding line is connected to a communication apparatus that communicates with the outside of the vehicle using the antenna 111. The feeding portion 30 is located on the side on which the ground plate 10 is disposed, with respect to the radiating plate 20.

In FIG. 3, the connecting conductor 40 is not in contact with the ground plate 10. The connecting conductor 40 has one end connected to the feeding portion 30 and the other end connected to the radiating plate 20 at the feeding point 22. The feeding point 22 is offset from the center of gravity 21 of the radiating plate 20, and is located on the negative side of the Y-axis direction with respect to the center of gravity 21 in the illustrated example. In a plan view of the radiating plate 20, the feeding point 22 overlaps with a reference line 28 that passes through the center of gravity 21 and is parallel to the Y-axis direction. When the radiating plate 20 is a symmetric figure such as a square, the center of gravity 21 corresponds to the center of the symmetric figure.

The antenna 111 can transmit and receive polarized waves in the direction of a straight line connecting the center of gravity 21 and the feeding point 22. In particular, when the antenna 111 is installed as shown in FIG. 1, it can transmit and receive vertically polarized waves, and can be suitably used as a V2X antenna.

Specific examples of the connecting conductor 40 include a conductor formed inside a through hole that penetrates the dielectric substrate 60 in the Z-axis direction, a core wire of a coaxial cable, and a pin-shaped conductor pin, but the connecting conductor 40 is not limited to these. When the medium between the ground plate 10 and the radiating plate 20 includes a space, specific examples of the connecting conductor 40 include a core wire of a coaxial cable and a conductor pin, but the connecting conductor 40 is not limited to these.

From the perspective of the radiating plate 20 side toward the ground plate 10, it is preferable that the center of gravity 21 of the radiating plate 20 overlap with the center of gravity 11 of the ground plate 10 in terms of improving the antenna gain of the antenna 111 in the direction from the ground plate 10 side toward the radiating plate 20 side. In this example, the perspective from the radiating plate 20 side toward the ground plate 10 represents the perspective from the positive side in the Z-axis direction, and the direction from the ground plate 10 side toward the radiating plate 20 side represents the direction toward the positive side in the Z-axis direction.

The parasitic element 50 is disposed away from the radiating plate 20 and is located on the positive side of the radiating surface 29 in the Z-axis direction. The parasitic element 50 is an unpowered conductor that is not connected to the feeding portion 30.

In FIG. 2, the parasitic element 50 includes a first parasitic conductor 51, a second parasitic conductor 52, and a third parasitic conductor 53. The first parasitic conductor 51 is a portion that is disposed in a first direction Xp (in this example, the positive side in the X-axis direction) with respect to the center of gravity 21 of the radiating plate 20 in a plan view of the radiating plate 20. The second parasitic conductor 52 is a portion that is disposed in a second direction Xn (in this example, the negative side in the X-axis direction) opposite the first direction Xp with respect to the center of gravity 21 of the radiating plate 20 in a plan view of the radiating plate 20. The third parasitic conductor 53 is a portion that connects the first parasitic conductor 51 and the second parasitic conductor 52.

In a plan view of the radiating plate 20, the first parasitic conductor 51 is disposed in a first direction Xp with respect to the center of gravity 21, and the second parasitic conductor 52 is disposed in a second direction Xn with respect to the center of gravity 21. Since the first parasitic conductor 51 and the second parasitic conductor 52 are disposed in this manner, they are positioned apart from each other on opposite sides of the radiating plate 20 in the vehicle width direction (the X-axis direction, which is the vehicle width direction in the illustrated example) in a state in which the antenna 111 is mounted on the vehicle. Since the first parasitic conductor 51 and the second parasitic conductor 52 are located on the opposite sides of the radiating plate 20 in the vehicle width direction and spaced apart from each other, the antenna gain of the antenna 111 is improved in the vehicle width direction in the horizontal plane.

If the antenna 111 does not include the parasitic element 50 (the first parasitic conductor 51, second parasitic conductor 52, and third parasitic conductor 53) and is disposed to face the windshield, the antenna gain is large in the travel direction (of the vehicle) perpendicular to the vehicle width direction in the horizontal plane, while the antenna gain is relatively small in the vehicle width direction. However, since the antenna 111 includes the first parasitic conductor 51 and second parasitic conductor 52, the antenna gain in the travel direction is appropriately distributed to the antenna gain in the vehicle width direction in the horizontal plane. As a result, directivity is obtained that ensures antenna gain over 180° ranging from the vehicle travel direction (forward or backward) to ±90° to the left and right in the horizontal plane.

In addition, since the first parasitic conductor 51 and the second parasitic conductor 52 are connected by the third parasitic conductor 53, the respective disposed positions of the first parasitic conductor 51 and the second parasitic conductor 52 are less likely to deviate. This causes the positional relationship between the first parasitic conductor 51 and the second parasitic conductor 52, the positional relationship between the first parasitic conductor 51 and the radiating plate 20, and the positional relationship between the second parasitic conductor 52 and the radiating plate 20 to be less likely to deviate. This improves the disposal accuracy of the first parasitic conductor 51 and the second parasitic conductor 52 of the antenna 111, and therefore prevents the variation in directivity, which ensures the antenna gain over 180° ranging from the vehicle travel direction (forward or backward) to at least ±90° to the left and right in the horizontal plane, for example.

The parasitic element 50 (the first parasitic conductor 51, the second parasitic conductor 52, and the third parasitic conductor 53) may be composed of one member or a plurality of members. In addition, part or all of the parasitic element 50 (the first parasitic conductor 51, the second parasitic conductor 52, and the third parasitic conductor 53) may be formed by pressing a metal plate such as a steel plate, or by molding. However, integrally forming all of them preferably improves productivity.

The third parasitic conductor 53 includes a portion that passes in the vicinity of the center of gravity 21 of the radiating plate 20 in a plan view of the radiating plate 20 and extends in the first direction Xp and the second direction Xn (i.e., a direction parallel to the ZX plane). The vicinity of the center of gravity 21 means a location away from the center of gravity 21, and an area that is close to the center of gravity 21 to the extent that the actions and effects of the present embodiment are not impaired. In addition, since the feeding point 22 is offset from the center of gravity 21 in the Y-axis direction on the radiating surface 29, the antenna 111 transmits and receives linearly polarized radio waves whose polarization plane is parallel to the YZ plane through the radiating surface 29. Therefore, even if the third parasitic conductor 53 includes a portion extending in the first direction Xp and the second direction Xn (directions parallel to the ZX plane), the third parasitic conductor 53 has almost no effect on the transmission and reception of linearly polarized radio waves whose polarization plane is parallel to the YZ plane. In other words, the third parasitic conductor 53 can prevent decrease in the antenna gain of the antenna 111 in the case of linearly polarized radio waves whose polarization plane is parallel to the YZ plane (for example, vertically polarized radio waves when the ZX plane is parallel to the horizontal plane).

The third parasitic conductor 53 may be fixed, for example, by press-fitting using a fixing member whose main component is a dielectric. This can prevent the decrease in antenna gain and the variation in directivity of the antenna 111 caused by the positional deviation of the third parasitic conductor 53. Specific examples of the fixing member include a snap fit formed inside a housing such as the outer case of the antenna 111.

When the third parasitic conductor 53 is fixed by a dielectric such as the fixing member described above, the first parasitic conductor 51 and the second parasitic conductor 52 each may include an exposed portion in contact with air, except for a portion connecting with the third parasitic conductor 53. This improves the antenna gain in the vicinity of the first parasitic conductor 51 and the second parasitic conductor 52 in the X-axis direction in the ZX plane compared to a form in which the first parasitic conductor 51 and the second parasitic conductor 52 are in contact with a dielectric having a higher relative dielectric constant than air. The exposed portion is exposed so as to be visible from the outside of the outer case of the antenna 111, for example.

In addition, it is suitable that the radiating surface 29 be inclined at an angle of ±15° or less with respect to a vertical plane perpendicular to the horizontal plane. This improves the antenna gain of the antenna 111 in a direction parallel to the horizontal plane. In particular, when the straight line (reference line 28) connecting the center of gravity 21 and the feeding point 22 of the radiating surface 29 is inclined at an angle of ±15° or less with respect to the vertical plane perpendicular to the horizontal plane, the antenna gain of the antenna 111 is improved in the case of vertically polarized waves. Contrarily, when the radiating surface 29 is inclined at an angle exceeding ±15° with respect to the vertical plane perpendicular to the horizontal plane, the balance of the antenna gain in a direction parallel to the horizontal plane may be lost, that is, the difference between the gain in the vehicle travel direction and the gain in the vehicle width direction may be large.

In terms of improving the antenna gain in a direction parallel to the horizontal plane, the radiating surface 29 is preferably inclined at an angle of ±10° or less with respect to the vertical plane perpendicular to the horizontal plane, and is more preferably inclined at an angle of ±5° or less.

In a plan view of the radiating plate 20, the direction orthogonal to the first direction Xp is defined as a third direction Yp (in this example, the positive side in the Y-axis direction), and the direction opposite to the third direction Yp is defined as a fourth direction Yn (in this example, the negative side in the Y-axis direction). Furthermore, the third direction Yp with respect to a reference line 27 that passes through the center of gravity 21 and is parallel to the first direction Xp is defined to be positive, the fourth direction Yn with respect to the reference line 27 is defined to be negative, and the length of the radiating surface 29 in the third direction is defined as D.

In this case, when the third parasitic conductor 53 overlaps with the area in the range of ±0.30×D from the reference line 27 in a plan view of the radiating plate 20, the antenna gain of the antenna 111 can be ensured in the case of linearly polarized radio waves whose polarization plane is parallel to the YZ plane. In terms of ensuring the antenna gain of the antenna 111, the third parasitic conductor 53 preferably overlaps with the area in the range of ±0.25×D from the reference line 27 in a plan view of the radiating plate 20, and more preferably overlaps with the area in the range of ±0.20×D from the reference line 27. In terms of ensuring the antenna gain of the antenna 111, the third parasitic conductor 53 further preferably overlaps with the area in the range of ±0.15×D from the reference line 27 in a plan view of the radiating plate 20, particularly preferably overlaps with the area in the range of ±0.10×D from the reference line 27, and most preferably overlaps with the area in the range of ±0.05×D from the reference line 27.

In a plan view of the radiating plate 20, the width of the third parasitic conductor 53 in the third direction Yp is defined as W, and the length of the first parasitic conductor 51 or the second parasitic conductor 52 in the third direction Yp is defined as L. In this case, if W/L satisfies $$W/L \leq 0.50,$$

the antenna gain of antenna 111 can be ensured in the case of linearly polarized radio waves whose polarization plane is parallel to the YZ plane. In terms of ensuring the antenna gain of antenna 111, W/L preferably satisfies $$W/L \leq 0.40,$$

W/L more preferably satisfies $$W/L \leq 0.30,$$

W/L further preferably satisfies $$W/L \leq 0.20,$$

W/L particularly preferably satisfies $$W/L \leq 0.15.$$

Note that the lower limit of W has no particular restriction, but from the viewpoint of keeping stable rigidity, it may be, for example, 0.1 mm or more, 0.3 mm or more, 0.5 mm or more, or 1.0 mm or more. Furthermore, the lower limit of W/L has no particular restriction, but it may be 0.01 or more, 0.02 or more, or 0.03 or more.

The third parasitic conductor 53 may have at least one of a portion in which the width W between both ends gradually increases and a portion in which the width W gradually decreases toward the extension direction (longitudinal direction). In addition, in the third parasitic conductor 53, the line in the extension direction between both ends, more specifically, the center line of the width W, is not limited to having a linearly extending shape, and the line may have a portion that partially bends or a portion that is partially wavy.

When the end of the third parasitic conductor 53 is connected to the first parasitic conductor 51 or the second parasitic conductor 52 at a position in the range of 30% or more and 70% or less of the length L, which is 100%, the antenna gain of the antenna 111 can be ensured in the case of linearly polarized radio waves whose polarization plane is parallel to the YZ plane. In terms of ensuring the antenna gain of antenna 111, the end of the third parasitic conductor 53 is preferably connected to the first parasitic conductor 51 or the second parasitic conductor 52 at a position in the range of 35% or more and 65% or less, and is preferably connected to the first parasitic conductor 51 or the second parasitic conductor 52 at a position in the range of 40% or more to 60% or less. The third parasitic conductor 53 may be disposed so that its extension direction (longitudinal direction) is inclined with respect to the X-axis within the above range. If the third parasitic conductor 53 is disposed so that its extension direction is inclined with respect to the X-axis, it is preferably disposed so as to overlap with the center of gravity 21 of the radiating plate 20 in a plan view of the radiating plate 20. Furthermore, the third parasitic conductor 53 may be disposed so that its extension direction (longitudinal direction) is substantially parallel to the X-axis within the above range, and is preferably disposed so that its extension direction is parallel to the X-axis.

If the second parasitic conductor 52 has the same shape as the first parasitic conductor 51 in a plan view of the radiating plate 20, the antenna gain of the antenna 111 can be ensured in the case of linearly polarized radio waves whose polarization plane is parallel to the YZ plane. However, the second parasitic conductor 52 does not have to have the same shape as the first parasitic conductor 51 in a plan view of the radiating plate 20.

Part or all of at least one of the first parasitic conductor 51 and the second parasitic conductor 52 may or may not overlap with the radiating plate 20 in a plan view of the radiating plate 20. FIG. 2 illustrates an example in which both the first parasitic conductor 51 and the second parasitic conductor 52 overlap with the radiating plate 20 in a plan view of the radiating plate 20.

Part or all of at least one of the first parasitic conductor 51 and the second parasitic conductor 52 may or may not overlap with the ground plate 10 in a plan view of the radiating plate 20. FIG. 2 illustrates an example in which both the first parasitic conductor 51 and the second parasitic conductor 52 overlap with the ground plate 10 in a plan view of the radiating plate 20. Here, that a disposal in which both the first parasitic conductor 51 and the second parasitic conductor 52 do not overlap with the ground plate 10 means that disposal in which the first parasitic conductor 51 and the second parasitic conductor 52 are disposed outside the outer edge of the ground plate 10.

The parasitic element 50 has a point-symmetric shape with the center of gravity 54 as the symmetry center. The center of gravity 54 represents the center of gravity of the parasitic element 50. FIG. 2 illustrates an example of an H-shaped shape that is point-symmetric with the center of gravity 54 as the symmetry center. However, the parasitic element 50 may have a shape that is not point-symmetric. Examples of shape that is not point-symmetric include a shape in which the length L of the first parasitic conductor 51 is different from that of the second parasitic conductor 52, and a shape in which the distance from the center of the third parasitic conductor 53 to the center of the first parasitic conductor 51 is different from that to the second parasitic conductor 52. Note that if the parasitic element 50 has an H-shaped point-symmetric (flat) shape, it is preferable that the shape be such that the longitudinal direction of the first parasitic conductor 51 is parallel to the longitudinal direction of the second parasitic conductor 52, and the longitudinal direction of the third parasitic conductor 53 is orthogonal to the longitudinal directions of the first parasitic conductor 51 and the second parasitic conductor 52. When the parasitic element 50 has such an H-shape, for example, it is not necessary to manage the front and back of the conductor (plate) that constitutes the parasitic element 50 or the rotational position of the conductor in the XY plane (in FIG. 2), resulting in improved productivity.

If the center of gravity 54 of the parasitic element 50 overlaps with the center of gravity 21 of the radiating plate 20 in a plan view of the radiating plate 20, the antenna gain of the antenna 111 can be ensured in the case of linearly polarized radio waves whose polarization plane is parallel to the YZ plane. However, the center of gravity 54 does not have to overlap with the center of gravity 21.

Figure 4:
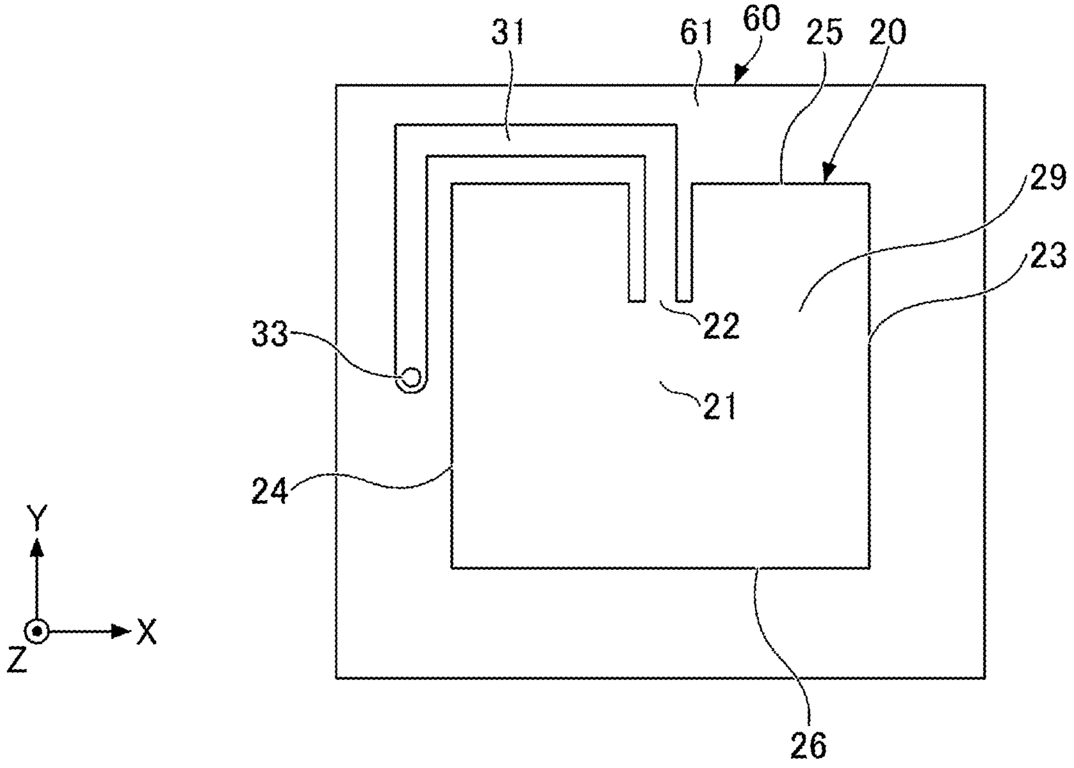
FIG. 4 is a plan view of a modified example of a radiating plate.

In a plan view of the radiating plate 20, the outer edge of the radiating plate 20 is substantially rectangular having a pair of sides 25, 26 parallel to the first direction Xp and a pair of sides 23, 24 parallel to a direction orthogonal to the first direction Xp. As illustrated in FIG. 4, the shape of the outer edge of the radiating plate 20 may be defined as substantially rectangular so long as the shape is rectangular overall even if some of the sides have a cutout.

FIG. 4 is a plan view of a modified example of the radiating plate. In FIG. 4, a cutout is provided on the side 25 of the radiating plate 20. FIG. 4 shows a feeding line 31 extending across the side 25. The feeding line 31 is an extension conductor that connects to the feeding point 22, and is disposed on a plane parallel to the radiating surface 29. In FIG. 4, the feeding line 31 is formed on the same plane as the radiating surface 29. Furthermore, the feeding line 31 extends from the feeding line end 33 to the back side of the dielectric substrate 60 and is connected to a transmission line such as a coaxial cable (not shown).

FIGS. 1 to 3 illustrate an example in which the first parasitic conductor 51 and the second parasitic conductor 52 are disposed on the opposite side of the ground plate 10 with respect to the radiating plate 20. Furthermore, FIGS. 1 to 3 illustrate an example in which the first parasitic conductor 51 and the second parasitic conductor 52 are disposed on an XY plane different from the XY plane on which the radiating surface 29 is disposed. However, the first parasitic conductor 51 and the second parasitic conductor 52 may be disposed on the same XY plane as the radiating surface 29 (for example, the first surface 61 of the dielectric substrate 60).

Figure 5:
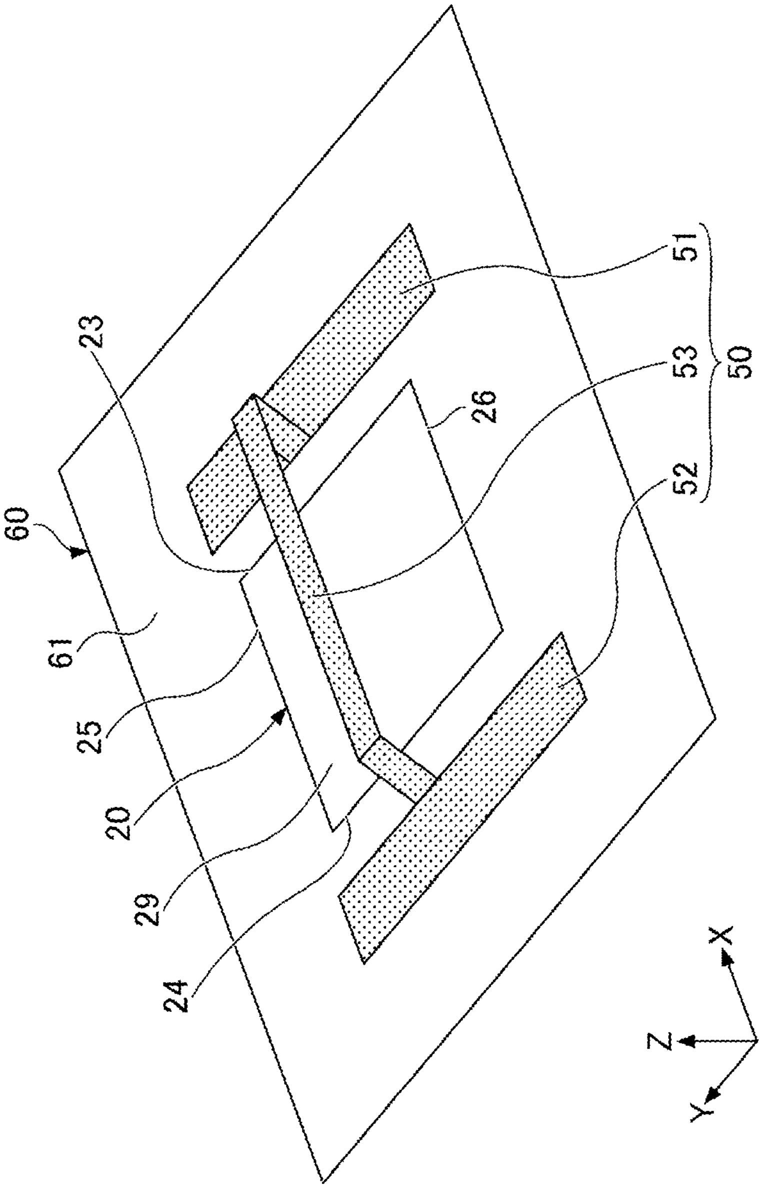
FIG. 5 is a perspective view of a modified example of a parasitic element.

FIG. 5 is a perspective view of a modified example of the parasitic element. FIG. 5 illustrates an example in which the first parasitic conductor 51 and the second parasitic conductor 52 do not overlap with the radiating plate 20 in a plan view of the radiating plate 20, and are disposed on the same XY plane as the radiating surface 29 (the first surface 61 of the dielectric substrate 60). FIG. 5 also illustrates an example in which the third parasitic conductor 53 has a bridge shape that extends in a direction different from the direction parallel to the radiating surface 29 and that spans the radiating surface 29 so as to create a gap between the third parasitic conductor 53 and the radiating surface 29. The third parasitic conductor 53 overlaps with the radiating surface 29 in the XY plan view.

Figure 6:
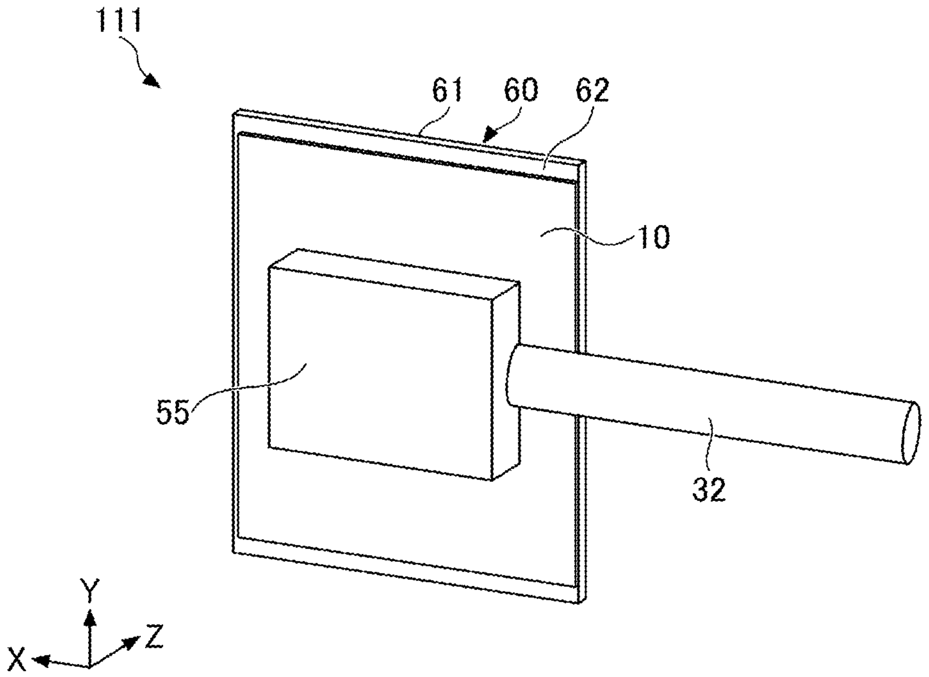
FIG. 6 is a perspective view of an antenna including a connector.

FIG. 6 is a perspective view of an antenna including a connector. The antenna 111 may be disposed on the opposite side of the radiating surface 29 with respect to the ground plate 10, and may include a connector 55 for connection to the coaxial cable 32. The connector 55 is a female connector into which a male connector is inserted that is provided at an end of the coaxial cable 32. The male connector provided at the end of the coaxial cable 32 is fitted into the connector 55, and thereby the inner conductor (signal line) of the coaxial cable 32 is electrically connected to the feeding point 22 of the radiating surface 29 and the outer conductor (shield) of the coaxial cable 32 is electrically connected to the ground plate 10. In particular, when the antenna 111 includes the connector 55, the end of the core wire of the coaxial cable 32 can be disposed in the vicinity of the back side of the feeding line end 33, as in the modified example of the radiating plate 20 shown in FIG. 4. This is likely to make it easy to secure space for fixing the connector 55 to the back side of the radiating plate 20.

Figure 7:
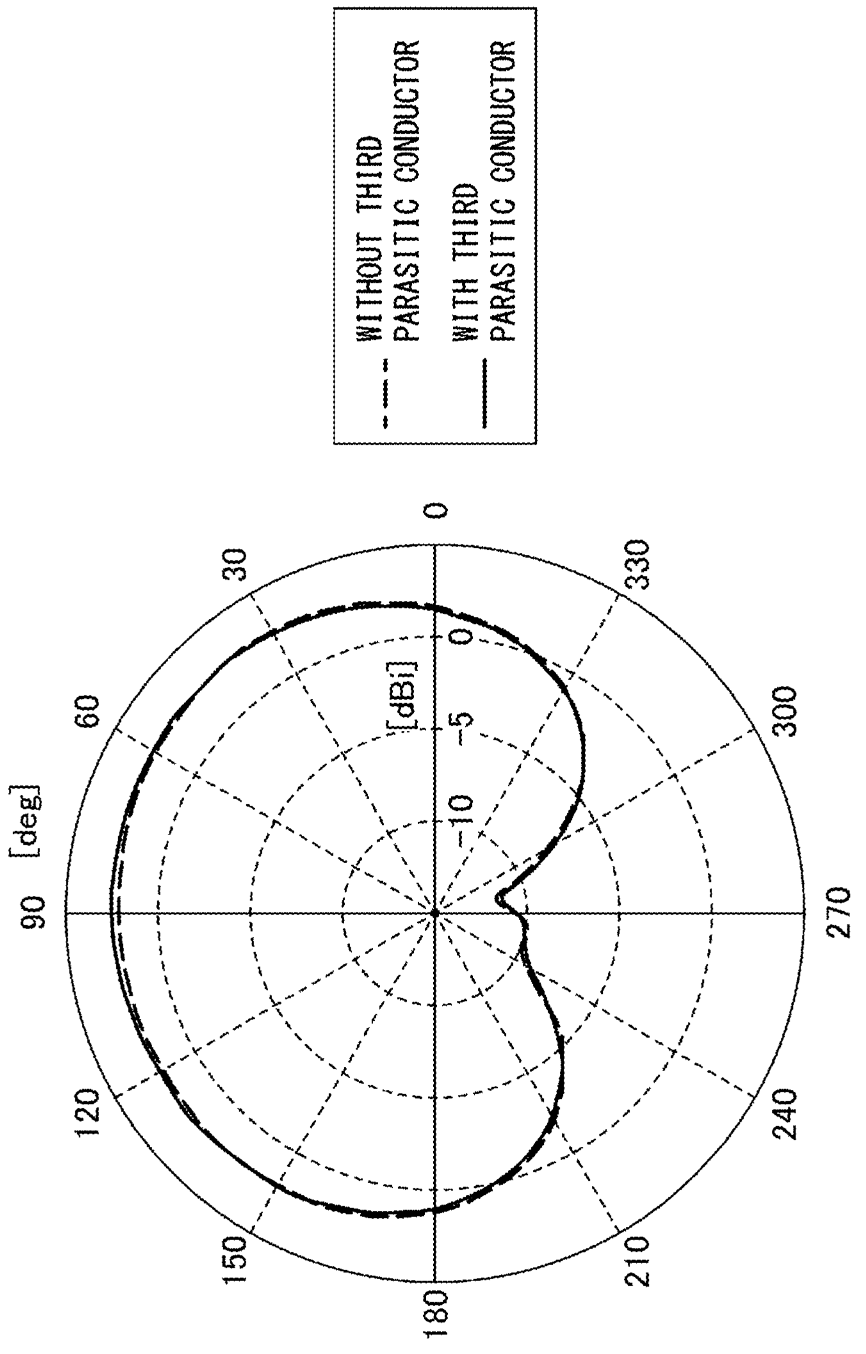
FIG. 7 is a diagram showing an example of a simulation results of antenna directivity.

FIG. 7 shows an example of the simulation results of the directivity of antenna 111 in the ZX plane under conditions of vertically polarized waves with a frequency of 5.88 GHZ. "With third parasitic conductor" represents an example of antenna 111, and "without third parasitic conductor" represents a configuration (comparative example) in which third parasitic conductor 53 is removed from antenna 111. In FIG. 7, the 90° direction is the normal direction of radiating surface 29, and is the direction assumed to be the vehicle travel direction.

As shown in FIG. 7, the results have been obtained that the directivity pattern is almost unchanged whether there is the third parasitic conductor 53 or not.

In the simulation of FIG. 7, the conditions of each part of the antenna 111 were as follows.

Ground plate 10: 19 mm long×19 mm wide

Dielectric substrate 60: 20 mm long×20 mm wide

Radiating surface 29: 12.7 mm long×12.7 mm wide

Length L of the first parasitic conductor 51 and the second parasitic conductor 52: 14 mm Width W of the third parasitic conductor 53: 1.5 mm Length of the third parasitic conductor 53: 27 mm Position of the feeding point 22: 2 mm offset from the center of gravity 21 in the Y-axis direction The two ends of the third parasitic conductor 53 were connected to the first parasitic conductor 51 and the second parasitic conductor 52 at positions that are 50% of the length L of each, and the center of the width W of the third parasitic conductor 53 was disposed so as to overlap with the center of gravity of the radiating surface 29. Furthermore, under these conditions, the first parasitic conductor 51 and the second parasitic conductor 52 were disposed so as not to overlap with the radiating plate 20 and the ground plate 10 in a plan view of the radiating plate 20.

As described above, the embodiments have been described, but the above embodiments are presented as examples, and the present invention is not limited to the above embodiments. The above embodiments can be implemented in various other forms, and various combinations, omissions, substitutions, modifications, etc. can be made without departing from the gist of the invention. These embodiments and their modifications are included in the scope and gist of the invention, and are included in the scope of the invention and its equivalents described in claims.

For example, the antenna is not limited to being disposed so that the radiating surface faces the window glass for vehicle, and may be installed on a vehicle surface such as the roof of the vehicle.

What is claimed is:

1. An antenna comprising:

a radiating plate having a radiating surface;

a ground plate disposed on the radiating plate with a dielectric interposed therebetween, the ground plate being disposed on an opposite side of the radiating surface of the radiating plate; and a parasitic element including: a first parasitic conductor disposed in a first direction with respect to a center of gravity of the radiating plate in a plan view of the radiating plate; a second parasitic conductor disposed in a second direction opposite to the first direction with respect to the center of gravity of the radiating plate in a plan view of the radiating plate; and a third parasitic conductor connecting the first parasitic conductor and the second parasitic conductor, wherein the third parasitic conductor includes a portion that passes in a vicinity of the center of gravity of the radiating plate and extends in the first direction and the second direction in a plan view of the radiating plate, and wherein W is smaller than D, where, in a plan view of the radiating plate, a direction orthogonal to the first direction is a third direction, a width of the third parasitic conductor in the third direction is W, and a length of the radiating surface in the third direction is D.

2. The antenna according to claim 1, wherein W/L satisfies $$W/L \leq 0.50,$$

where, in the plan view of the radiating plate, a length of the first parasitic conductor or the second parasitic conductor in the third direction is L.

3. The antenna according to claim 2, wherein an end of the third parasitic conductor is connected to the first parasitic conductor or the second parasitic conductor at a position in a range of 30% or more and 70% or less when the length L is 100%.

4. The antenna according to claim 1, wherein in the plan view of the radiating plate, a direction opposite to the third direction is defined as a fourth direction; the third direction with respect to a reference line is defined to be positive, the reference line passing through the center of gravity of the radiating plate, the reference line being parallel to the first direction; the fourth direction with respect to the reference line is defined to be negative; and the third parasitic conductor overlaps with an area in a range of ±0.30×D from the reference line in the plan view of the radiating plate.

5. The antenna according to claim 1, wherein, in the plan view of the radiating plate, the second parasitic conductor has the same shape as the first parasitic conductor.

6. The antenna according to claim 1, wherein in the plan view of the radiating plate, an outer edge of the radiating plate is of a substantially rectangular shape having a pair of sides parallel to the first direction and a pair of sides parallel to a direction orthogonal to the first direction, and a feeding line is disposed on a plane parallel to the radiating surface, the feeding line being an extension conductor connected to a feeding point of the radiating plate.

7. The antenna according to claim 1, wherein at least one of the first parasitic conductor and the second parasitic conductor does not overlap with the radiating plate in a plan view of the radiating plate.

8. The antenna according to claim 1, wherein at least one of the first parasitic conductor and the second parasitic conductor does not overlap with the ground plate in a plan view of the radiating plate.

9. The antenna according to claim 1, wherein the parasitic element has a point-symmetric shape.

10. The antenna according to claim 9, wherein a center of gravity of the parasitic element overlaps with the center of gravity of the radiating plate in a plan view of the radiating plate.

11. The antenna according to claim 1, wherein the first parasitic conductor and the second parasitic conductor are disposed on an opposite side of the ground plate with respect to the radiating plate.

12. The antenna according to claim 1, wherein the first parasitic conductor and the second parasitic conductor are disposed on a plane different from the radiating surface.

13. The antenna according to claim 1, wherein the third parasitic conductor has a bridge shape that extends in a direction different from a direction parallel to the radiating surface and that spans the radiating surface.

14. The antenna according to claim 13, wherein the first parasitic conductor and the second parasitic conductor do not overlap with the radiating plate in the plan view of the radiating plate and are disposed on the same plane as the radiating surface.

15. The antenna according to claim 1, further comprising a connector, disposed on an opposite side of the radiating surface with respect to the ground plate, for connection to a coaxial cable.

16. The antenna according to claim 1, wherein the third parasitic conductor is fixed by a dielectric.

17. The antenna according to claim 16, wherein the first parasitic conductor and the second parasitic conductor are each in contact with air except for a portion connected to the third parasitic conductor.

18. An antenna apparatus for vehicle, comprising:

a window glass for vehicle; and the antenna according to claim 1, disposed so that the radiating surface faces the window glass, wherein the radiating surface is inclined at an angle of ±15° or less with respect to a vertical plane perpendicular to a horizontal plane.

19. The antenna apparatus for vehicle according to claim 18, wherein on the radiating surface, a straight line connecting the center of gravity of the radiating plate and a feeding point of the radiating plate is inclined at an angle of ±15° or less with respect to a vertical plane perpendicular to a horizontal plane, and a frequency band of radio waves received by the antenna includes a 5.8 GHz band or a 5.9 GHz band.

20. The antenna apparatus for vehicle according to claim 18, wherein the antenna is a V2X antenna.

* * * * *